United States Patent
Basener

(10) Patent No.: US 8,897,489 B2
(45) Date of Patent: Nov. 25, 2014

(54) METHODS FOR OBJECT-BASED IDENTIFICATION, SORTING AND RANKING OF TARGET DETECTIONS AND APPARATUSES THEREOF

(75) Inventor: William Basener, Avon, NY (US)

(73) Assignee: Rochester Institute of Technology, Rochester, NY (US)

( * ) Notice: Subject to any disclaimer, the term of this patent is extended or adjusted under 35 U.S.C. 154(b) by 607 days.

(21) Appl. No.: 13/015,894

(22) Filed: Jan. 28, 2011

(65) Prior Publication Data

US 2012/0070033 A1 Mar. 22, 2012

Related U.S. Application Data

(60) Provisional application No. 61/337,065, filed on Jan. 29, 2010.

(51) Int. Cl.
*G06K 9/00* (2006.01)
*G06K 9/34* (2006.01)
*G06K 9/32* (2006.01)

(52) U.S. Cl.
CPC .............. *G06K 9/3233* (2013.01); *G06K 9/342* (2013.01)
USPC ....................................................... 382/103

(58) Field of Classification Search
None
See application file for complete search history.

(56) References Cited

U.S. PATENT DOCUMENTS

| | | | | |
|---|---|---|---|---|
| 5,500,904 | A * | 3/1996 | Markandey et al. | 382/103 |
| 6,018,728 | A * | 1/2000 | Spence et al. | 706/20 |
| 7,561,718 | B2 * | 7/2009 | Sugimoto | 382/103 |
| 7,760,940 | B2 * | 7/2010 | Terakawa | 382/170 |
| 8,160,360 | B2 * | 4/2012 | Kim et al. | 382/180 |
| 2006/0098875 | A1 * | 5/2006 | Sugimoto | 382/190 |
| 2009/0067721 | A1 * | 3/2009 | Kim et al. | 382/180 |
| 2010/0135544 | A1 * | 6/2010 | Mattiuzzi et al. | 382/128 |

FOREIGN PATENT DOCUMENTS

JP 2010-186433 * 2/2009 ................... 382/103

OTHER PUBLICATIONS

Conputer generated Translation for JP2010*186433 Aoyama et al Feb. 13, 2009.*

* cited by examiner

*Primary Examiner* — Nancy Bitar
(74) *Attorney, Agent, or Firm* — Joseph M. Noto; Bond Schoeneck & King PLLC

(57) ABSTRACT

A method, non-transitory computer readable medium, and apparatus that provides object-based identification, sorting and ranking of target detections includes determining a target detection score for each pixel in each of one or more images for each of one or more targets. A region around one or more of the pixels with the determined detection scores which are higher than the determined detection scores for the remaining pixels in each of the one or more of images is identified. An object based score for each of the identified regions in each of the one or more images is determined. The one or more identified regions with the determined object based score for each region is provided.

33 Claims, 2 Drawing Sheets

METHODS FOR OBJECT-BASED IDENTIFICATION, SORTING AND RANKING OF TARGET DETECTIONS AND APPARATUSES THEREOF

This application claims the benefit of U.S. Provisional Patent Application Ser. No. 61/337,065 filed Jan. 29, 2010, which is hereby incorporated by reference in its entirety.

FIELD

This technology relates to methods and apparatuses for target detection and, more particularly to methods for object-based identification, sorting and ranking of target detections and apparatuses thereof.

BACKGROUND

Target detection in spectral digital imagery relates to the detection of known materials with a given target spectrum from the spectral digital imagery. Target detection is useful in a variety of different applications, for example to aid in medical diagnoses, to identify soils indicative of particular types of natural resources such as oil or minerals, to identify drug smugglers in a mountainous region, or to identify any number of military and intelligence targets by way of example only.

Two of the primary challenges with existing target detection processes are the massive amounts of data and imperfect detection algorithms which require large amounts of manual verification. Existing target detection methods are extremely time intensive because the detection plane for each target on each image must be manually inspected.

For example, given that a typical target library may have 10-50 target signatures and a collection may create 50 images per day, a single day may yield 500-2500 detection planes for analysis. For a modest daily collection resulting in 500 detection planes, an analyst working eight hours would have less than one minute to inspect each detection plane. Given that inspection of the detection requires viewing both the detection plane and the original image, visual inspection of the spectra for each high-scoring pixel, preferably with additional high resolution imagery, the simple opening and viewing of the large files can require more than the available time for analysis. Accordingly, a practical real-time target detection with existing target detection processes is simply time probative.

SUMMARY

An exemplary method for sorting and ranking detections of one or more targets includes determining with a target detection processing apparatus a target detection score for each pixel in each of one or more images for each of one or more targets. A region around one or more of the pixels with the determined detection scores which are higher than the determined detection scores for the remaining pixels in each of the one or more images is identified with the target detection processing apparatus. An object based score for each of the identified regions in each of the one or more images is determined with the target diction processing apparatus. The one or more identified regions with the determined object based score for each region can be ranked by the target detection processing apparatus according to the object-based detection/identification score and provided.

A non-transitory computer readable medium having stored thereon instructions for sorting and ranking detections of one or more targets comprising machine executable code which when executed by at least one processor, causes the processor to perform steps including applying a statistical target detection filter to each pixel in each of one or more images for each of one or more targets to determine a statistical detection score. A region around one or more of the pixels with the determined statistical detection scores which are higher than the determined statistical detection scores for the remaining pixels in each of the one or more of images is identified. An object-based score for each of the identified regions in each of the one or more images is determined. The one or more identified regions with the determined object-based score for each of the one or more images are provided and can be ranked according to the object-based detection/identification score.

A target detection processing apparatus includes one or more processors and a memory coupled to the one or more processors which are configured to execute programmed instructions stored in the memory including applying a statistical target detection filter to each pixel in each of one or more images for each of one or more targets to determine a statistical detection score. A region around one or more of the pixels with the determined statistical detection scores which are higher than the determined statistical detection scores for the remaining pixels in each of the one or more of images is identified. An object-based score for each of the identified regions in each of the one or more images is determined. The one or more identified regions with the determined object-based score for each of the one or more images is provided.

This technology provides a number of advantages including providing a more efficient, effective and automated method for object-based sorting and ranking of target detections. This technology is particularly helpful with target detection within large image datasets.

Additionally, this technology eliminates the need for an analyst to visually inspect all data and instead enables the analyst to quickly focus on an accurate and ranked list of target detections within each detection plane. More specifically, the object-based scores resulting from this technology can, for example, be used to rank and prioritize analysis of the regions, to locate the regions in a geospatial information system (GIS), to provide more detailed information about the object in the region, and otherwise enable searching of the regions in a database.

Further, since the target detections with this technology are object-based, additional processes, such as material quantification, advanced material identification and local infeasibility metrics, can easily be automated and integrated with this technology.

DETAILED DESCRIPTION

Figure 1:
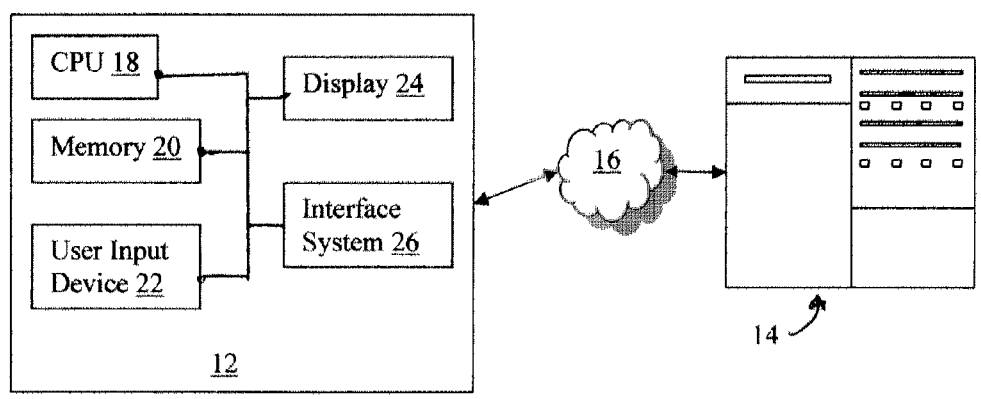
FIG. 1 is a block diagram of an environment with an exemplary target detection processing apparatus.

An environment 10 with an exemplary target detection processing apparatus 12 is illustrated in FIG. 1. The environment 10 includes the target detection processing apparatus 12 and an image and target signature library server 14 coupled together by a communications network 16, although the environment can comprise other types and numbers of systems, devices, networks, and elements in other configurations. This technology provides a number of advantages including providing a more efficient, effective and automated method for object-based sorting and ranking of target detections.

The target detection processing apparatus 12 includes a processor 18, memory storage device 20, a user input device 22, a display 24, and an interface system 26 which are coupled together by bus or other link, although the device may comprise other types and numbers of elements in other configurations.

The processor 18 in the target detection processing apparatus 12 executes a program of stored instructions for one or more aspects of the present invention as described and illustrated herein, although the processor could execute other numbers and types of programmed instructions. The memory storage device 20 in the target detection processing apparatus 12 stores these programmed instructions for one or more aspects of the present invention as described and illustrated herein, although some or all of the programmed instructions could be stored and/or executed elsewhere. A variety of different types of memory storage devices, such as a random access memory (RAM) or a read only memory (ROM) in the system or a floppy disk, hard disk, CD ROM, or other computer readable medium which is read from and/or written to by a magnetic, optical, or other reading and/or writing system that is coupled to the processor 18 in the target detection processing apparatus 12 can be used for the memory storage device 20 in the target detection processing apparatus 12.

The user input device 22 in the target detection processing apparatus 12 is used to input selections and data, although the user input device could be used to input other types of information and interact with other elements. The user input device 22 can include a computer keyboard and a computer mouse, although other types and numbers of user input devices can be used.

The display 24 in the target detection processing apparatus 12 is used to show images and other information to the user. The display 24 can include a computer display screen, such as a CRT or LCD screen, although other types and numbers of displays could be used.

The interface system 26 is used to operatively couple and communicate between the target detection processing apparatus 12 and the image and target signature library server 14 over the communication network 16, although other types and numbers of communication networks or systems with other types and numbers of connections and configurations to other types and numbers of systems, devices, and components can be used. By way of example only, the communication network can use TCP/IP over Ethernet and industry-standard protocols, including SOAP, XML, LDAP, and SNMP, although other types and numbers of communication networks, such as a direct connection, a local area network, a wide area network, modems and phone lines, e-mail, and wireless communication technology, each having their own communications protocols, can be used.

The image and target signature server library 14 includes a central processing unit (CPU) or processor, a memory, and an interface or I/O system, which are coupled together by a bus or other link, although other numbers and types of network devices could be used. For example, the target signatures could be stored in other types of storage or computing devices and the images could be obtained directly from image capture sensors or other storage devices. Generally, in this example the image and target signature server library 14 process requests received from the target detection processing apparatus 12 via communication network 16 for images and signatures, although other types of requests for other types of data could be processed. The image and target signature server library 14 may provide data or receive data in response to requests from the target detection processing apparatus 12.

Although the target detection processing apparatus 12 and image and target signature library server 14 are described and illustrated herein, other types and numbers of systems, devices, components, and elements in other topologies can be used. It is to be understood that the systems of the examples described herein are for exemplary purposes, as many variations of the specific hardware and software used to implement the examples are possible, as will be appreciated by those skilled in the relevant art(s).

Furthermore, each of the systems of the examples may be conveniently implemented using one or more general purpose computer systems, microprocessors, digital signal processors, and micro-controllers, programmed according to the teachings of the examples, as described and illustrated herein, and as will be appreciated by those ordinary skill in the art.

In addition, two or more computing systems or devices can be substituted for any one of the systems in any example. Accordingly, principles and advantages of distributed processing, such as redundancy and replication also can be implemented, as desired, to increase the robustness and performance of the devices and systems of the examples. The examples may also be implemented on computer system or systems that extend across any suitable network using any suitable interface mechanisms and communications technologies, including by way of example only telecommunications in any suitable form (e.g., voice and modem), wireless communications media, wireless communications networks, cellular communications networks, G3 communications networks, Public Switched Telephone Network (PSTNs), Packet Data Networks (PDNs), the Internet, intranets, and combinations thereof.

The examples may also be embodied as non-transitory computer readable medium having instructions stored thereon for one or more aspects of the technology as described and illustrated by way of the examples herein, which when executed by a processor (or configurable hardware), cause the processor to carry out the steps necessary to implement the methods of the examples, as described and illustrated herein.

Figure 2:
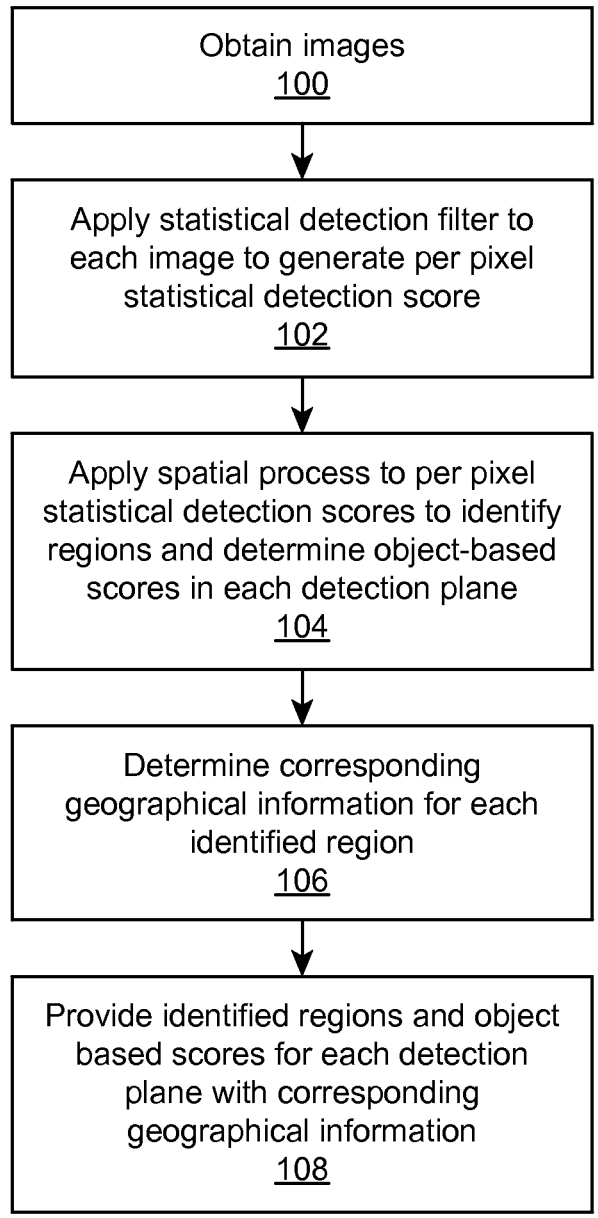
FIG. 2 is a flow chart of an exemplary method for object-based identification, sorting, and ranking of target detections.

An exemplary method for object-based identification, sorting and ranking of target detections scores in multi-band spectral imagery will now be described with reference to FIGS. 1-2. In step 100, the target detection processing apparatus 12 obtains a plurality multi-band spectral imagery from the image and target signature library server 14, although other numbers and types of images can be obtained in other manners, such as directly from image sensors capturing the data by way of example only.

In step 102, the target detection processing apparatus 12 applies a target detection algorithm, such as a statistical matched filter to the imagery using one or more signatures of desired targets obtained from the image and target signature library server 14 to determine a target detection score for each pixel, although the other types of target detection scores for other numbers and types of image elements can be determined and used. Additionally, the signatures can be obtained from other sources and in other manners, such as from memory in the target detection processing apparatus 12. The set of detection scores on pixels in a single image for a single target is called a detection plane. The target detection processing apparatus 12 ranks each pixel, for example by a number of standard deviations from a mean for the detection plane to generate a statistical detection score for every pixel in every image, although other manners and types of scores could be determined. In this example, the statistical detection score is used to compare the strength of detections of targets across the set of obtained images.

In step 104, the target detection processing apparatus 12 determines an object-based score for identified regions in each of the one or more images identified from the determined target detection scores, although other types of scores for other identified aspects could be determined. An object-based score is any metric that is computed from the pixels in an identified region using a process that provides better understanding of the material or object in the region. By way of example only, such processes implemented by the target detection processing apparatus 12 include linear regression and unmixing with a large library, computation of infeasibility metrics, spatial filtering, or any other process that provides a better understanding of the object at the location of the pixel with a target detection score above a detection threshold. One exemplary method for determining one or more of the object-based scores is described below.

To determine the object-based scores, the target detection processing apparatus 12 identifies a region around the pixel with the highest determined statistical detection score over all detection planes to turn the per-pixel statistical detections scores or other target detection scores into object-based scores. The region could be created with the target detection processing apparatus 12 for example as a square of fixed radius centered at on the pixel or using spatial processing such as edge detection, although other types of areas could be identified and scores could be generated.

More specifically, in this particular example the target detection processing apparatus 12 identifies the highest scoring pixel in the image collection (e.g. call this highest scoring pixel x) and selects a local region around this pixel. Next, end members ($e_1, e_2, \ldots, e_n$) are chosen by target detection processing apparatus 12 from this local region after the top statistical detection scores for the given target are masked out. The convex hull of these end members is a geometric model of the background for the detected pixel and is determined by target detection processing apparatus 12. The pixel is then "unmixed" by target detection processing apparatus 12 by finding abundances $a_1, a_2, \ldots, a_i, a_t$ that give the best approximation of the pixel spectra as a linear combination of the background end members and the target, $$x \approx \sum_{i=1}^{n} a_i e_i + a_t t.$$

The background portion of the pixel is $$b = \sum_{i=1}^{n} a_i e_i,$$

and the residual portion of the pixel is r=x−b. The estimated target fill percentage of the pixel is $a_t$ and the unmixing error is given by the target detection processing apparatus 12 comparing the target spectra to the residual spectra using a metric, such as spectra angle or percentage:

$$\% \text{ error} = \left\| t - \frac{\|t\|}{\|r\|} r \right\|.$$

The list of detections by the target detection processing apparatus 12 can contain metadata, such as time, latitude, longitude, nearby detected materials, and can be stored, cataloged and searched as a database.

In step 106, the target detection processing apparatus 12 may also obtain geographic location information associated with each of the images at capture. The target detection processing apparatus 12 overlays this obtained geographic location with each of the one or more identified regions in each of the detection planes to obtain and provide location information.

Steps 104-106 are repeated iteratively, removing the pixels in each region from consideration in subsequent iterations, until all pixels with a detection score in any detection plane above a given threshold are included in one of the regions.

In step 108, the target detection processing apparatus 12 provides the one or more identified regions with the determined object-based score for each region. The target detection processing apparatus 12 may also provide the corresponding geographic location information associated with each of the identified regions and determined object-based, although other types of other data could also be provided. The list of detected objects can be sorted by object-based scores for one image or across multiple images, displayed geographically in a geospatial information system, or otherwise exploited in a searchable database.

Accordingly, as illustrated and described herein this technology provides a more efficient, effective and automated method for object-based, identification, sorting and ranking of target detections. This technology is particularly helpful with target detection within large image datasets. Additionally, this technology eliminates the need for an analyst to visually inspect all data and instead enables the analyst to quickly focus on an accurate and ranked list of target detections within each detection plane. Further, since the target detections with this technology are object-based, additional processes, such as material quantification and local infeasibility metrics, can easily be automated and integrated with this technology.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for identification, sorting and ranking detections of one or more targets, the method comprising:

determining with a target detection processing apparatus a target detection score for each pixel of a spectral image for one or more targets by obtaining with the target detection processing apparatus a signature for one or more of the targets for the image, and applying with the target detection processing apparatus the statistical target detection filter using the one or more obtained signatures to rank each of the pixels by its statistical score;

identifying with the target detection processing apparatus a region around one or more of the pixels with the determined detection scores which are higher than a first score in said image;

determining with the target detection processing apparatus an object-based spectral identification score for each of the identified regions in said image; and providing with the target detection processing apparatus the one or more identified regions with the determined object-based score for each region.

2. The method as set forth in claim 1 wherein the determining with a target detection processing apparatus a target detection score for each pixel further comprising applying with the target detection processing apparatus a statistical target detection filter to each pixel in said image for each of the one or more targets to determine the detection score for each of the pixels.

3. A method for identification, sorting and ranking detections of one or more targets, the method comprising:

determining with a target detection processing apparatus a target detection score for each pixel in each of one or more images for each of one or more targets;

identifying with the target detection processing apparatus a region around one or more of the pixels with the determined detection scores which are higher than a first score in each of the one or more of images;

determining with the target detection processing apparatus an object-based score for each of the identified regions in each of the one or more images; and providing with the target detection processing apparatus the one or more identified regions with the determined object-based score for each region, wherein the determining a target detection score further comprises:

obtaining with the target detection processing apparatus a signature for one or more of the targets for each of the one or more images; and applying with the target detection processing apparatus the statistical target detection filter using the one or more obtained signatures to rank each of the pixels by a number of standard deviations from a mean for each of the one or more images to determine the statistical deviation score.

4. A method for identification, sorting and ranking detections of one or more targets, the method comprising:

determining with a target detection processing apparatus a target detection score for each pixel in each of one or more images for each of one or more targets;

identifying with the target detection processing apparatus a region around one or more of the pixels with the determined detection scores which are higher than a first score in each of the one or more of images;

determining with the target detection processing apparatus an object-based score for each of the identified regions in each of the one or more images; and providing with the target detection processing apparatus the one or more identified regions with the determined object-based score for each region, wherein the identifying further comprises:

masking out from each of the regions with the target detection processing apparatus the one or more of the pixels in each of the one or more images which have the highest determined statistical detection scores in each of the one or more images;

selecting with the target detection processing apparatus one or of the pixels which are end members for each of the regions; and identifying with the target detection processing apparatus a convex hull of the selected end members as a boundary for the one or more regions for each of the one or more of images.

5. A method for identification, sorting and ranking detections of one or more targets, the method comprising:

determining with a target detection processing apparatus a target detection score for each pixel in each of one or more images for each of one or more targets;

identifying with the target detection processing apparatus a region around one or more of the pixels with the determined detection scores which are higher than a first score in each of the one or more of images;

determining with the target detection processing apparatus an object-based score for each of the identified regions in each of the one or more images; and providing with the target detection processing apparatus the one or more identified regions with the determined object-based score for each region, wherein the determining the object based score further comprises:

unmixing with the target detection processing apparatus the pixel with highest determined statistical detection score in each of the identified regions by finding one or more abundances to determine pixel spectra; and comparing with the target detection processing apparatus target spectra for each of the one or more targets with the determined pixel spectra to determine the object based score for each of the identified regions.

6. The method as set forth in claim 1 further comprising obtaining with the target detection processing apparatus the image.

7. The method as set forth in claim 6 wherein the obtaining the image further comprises obtaining with the target detection processing apparatus one or more hyperspectral images.

8. The method as set forth in claim 1 further comprising providing with the target detection processing apparatus geographic location information for each the one or more identified regions in said image.

9. The method as set forth in claim 1 further comprising ranking with the target detection processing apparatus each of the identified regions based on the object-based score for one or more of the targets, wherein the providing further comprises providing the ranking for each of the one or more identified regions for one or more of the targets.

10. A non-transitory computer readable medium having stored thereon instructions for identification, sorting and ranking detections of one or more targets comprising machine executable code which when executed by at least one processor, causes the processor to perform steps comprising:

determining a target detection score for each pixel in a spectral image for each of one or more targets by obtaining a signature for one or more of the targets for the image, and applying the statistical target detection filter using the one or more obtained signatures to rank each of the pixels by its statistical score;

identifying a region around one or more of the pixels with the determined detection scores which are higher than a first score in said image;

determining an object-based spectral identification score for each of the identified regions in said image; and providing the one or more identified regions with the determined object-based spectral identification score for each region.

11. The medium as set forth in claim 10 wherein the determining a target detection score for each pixel further comprising applying a statistical target detection filter to each pixel in said image for each of the one or more targets to determine the detection score for each of the pixels.

12. A non-transitory computer readable medium having stored thereon instructions for identification, sorting and ranking detections of one or more targets comprising machine executable code which when executed by at least one processor, causes the processor to perform steps comprising:
determining a target detection score for each pixel in each of one or more images for each of one or more targets;
identifying a region around one or more of the pixels with the determined detection scores which are higher than a first score in each of the one or more of images;
determining an object-based score for each of the identified regions in each of the one or more images; and
providing the one or more identified regions with the determined object-based score for each region, wherein the determining a target detection score further comprises:
obtaining a signature for one or more of the targets for each of the one or more images; and
applying the statistical target detection filter using the one or more obtained signatures to rank each of the pixels by a number of standard deviations from a mean for each of the one or more images to determine the statistical deviation score.

13. A non-transitory computer readable medium having stored thereon instructions for identification, sorting and ranking detections of one or more targets comprising machine executable code which when executed by at least one processor, causes the processor to perform steps comprising:
determining a target detection score for each pixel in each of one or more images for each of one or more targets;
identifying a region around one or more of the pixels with the determined detection scores which are higher than a first score in each of the one or more of images;
determining an object-based score for each of the identified regions in each of the one or more images; and
providing the one or more identified regions with the determined object-based score for each region, wherein the identifying further comprises:
masking out from each of the regions the one or more of the pixels in each of the one or more images which have the highest determined statistical detection scores in each of the one or more images;
selecting one or of the pixels which are end members for each of the regions; and
identifying a convex hull of the selected end members as a boundary for the one or more regions for each of the one or more of images.

14. A non-transitory computer readable medium having stored thereon instructions for identification, sorting and ranking detections of one or more targets comprising machine executable code which when executed by at least one processor, causes the processor to perform steps comprising:
determining a target detection score for each pixel in each of one or more images for each of one or more targets;
identifying a region around one or more of the pixels with the determined detection scores which are higher than a first score in each of the one or more of images;
determining an object-based score for each of the identified regions in each of the one or more images; and
providing the one or more identified regions with the determined object-based score for each region, wherein the determining the object based score further comprises:
unmixing the pixel with highest determined statistical detection score in each of the identified regions by finding one or more abundances to determine pixel spectra; and
comparing target spectra for each of the one or more targets with the determined pixel spectra to determine the object based score for each of the identified regions.

15. The medium as set forth in claim 10 further comprising obtaining with the target detection processing apparatus the image.

16. The medium as set forth in claim 15 wherein the obtaining the image further comprises obtaining one or more hyperspectral images.

17. The medium as set forth in claim 10 further comprising providing geographic location information for each the one or more identified regions in said image.

18. The medium as set forth in claim 10 further comprising ranking each of the identified regions based on the object-based score for one or more of the targets, wherein the providing further comprises providing the ranking for each of the one or more identified regions for one or more of the targets.

19. A target detection processing apparatus comprising:
one or more processors;
a memory coupled to the one or more processors which are configured to execute programmed instructions stored in the memory comprising:
determining a target detection score for each pixel in a spectral image for each of one or more targets by obtaining a signature for one or more of the targets for the image, and applying the statistical target detection filter using the one or more obtained signatures to rank each of the pixels by its statistical score;
identifying a region around one or more of the pixels with the determined detection scores which are higher than a first score in said image;
determining an object-based spectral identification score for each of the identified regions in said image; and
providing the one or more identified regions with the determined object-based spectral identification score for each region.

20. The apparatus as set forth in claim 19 wherein the one or more processors is further configured to execute programmed instructions stored in the memory for the determining the target detection score for each pixel further comprising applying a statistical target detection filter to each pixel in said image for each of the one or more targets to determine the detection score for each of the pixels.

21. A target detection processing apparatus comprising:
one or more processors;
a memory coupled to the one or more processors which are configured to execute programmed instructions stored in the memory comprising:
determining a target detection score for each pixel in each of one or more images for each of one or more targets;
identifying a region around one or more of the pixels with the determined detection scores which are higher than a first score in each of the one or more of images;
determining an object-based score for each of the identified regions in each of the one or more images; and
providing the one or more identified regions with the determined object-based score for each region, wherein the one or more processors is further configured to execute programmed instructions stored in the memory for the determining a target detection score further comprising:
obtaining a signature for one or more of the targets for each of the one or more images; and
applying the statistical target detection filter using the one or more obtained signatures to rank each of the pixels by a number of standard deviations from a mean for each of the one or more images to determine the statistical deviation score.

22. A target detection processing apparatus comprising:
one or more processors;
a memory coupled to the one or more processors which are configured to execute programmed instructions stored in the memory comprising:
determining a target detection score for each pixel in each of one or more images for each of one or more targets;
identifying a region around one or more of the pixels with the determined detection scores which are higher than a first score in each of the one or more of images;
determining an object-based score for each of the identified regions in each of the one or more images; and
providing the one or more identified regions with the determined object-based score for each region, wherein the one or more processors is further configured to execute programmed instructions stored in the memory for the identifying further comprising:
masking out from each of the regions the one or more of the pixels in each of the one or more images which have the highest determined statistical detection scores in each of the one or more images;
selecting one or of the pixels which are end members for each of the regions; and
identifying a convex hull of the selected end members as a boundary for the one or more regions for each of the one or more of images.

23. A target detection processing apparatus comprising:
one or more processors;
a memory coupled to the one or more processors which are configured to execute programmed instructions stored in the memory comprising:
determining a target detection score for each pixel in each of one or more images for each of one or more targets;
identifying a region around one or more of the pixels with the determined detection scores which are higher than a first score in each of the one or more of images;
determining an object-based score for each of the identified regions in each of the one or more images; and
providing the one or more identified regions with the determined object-based score for each region, wherein the one or more processors is further configured to execute programmed instructions stored in the memory for the determining the object based score further comprising:
unmixing the pixel with highest determined statistical detection score in each of the identified regions by finding one or more abundances to determine pixel spectra; and
comparing target spectra for each of the one or more targets with the determined pixel spectra to determine the object based score for each of the identified regions.

24. The apparatus as set forth in claim 19 wherein the one or more processors is further configured to execute programmed instructions stored in the memory further comprising obtaining with the target detection processing apparatus the image.

25. The apparatus as set forth in claim 24 wherein the one or more processors is further configured to execute programmed instructions stored in the memory for the obtaining the image further comprising obtaining one or more hyperspectral images.

26. The apparatus as set forth in claim 19 wherein the one or more processors is further configured to execute programmed instructions stored in the memory further comprising providing geographic location information for each the one or more identified regions in said image.

27. The apparatus as set forth in claim 19 wherein the one or more processors is further configured to execute programmed instructions stored in the memory further comprising ranking each of the identified regions based on the object-based score for one or more of the targets, wherein the providing further comprises providing the ranking for each of the one or more identified regions for one or more of the targets.

28. The method as set forth in claim 1 wherein the identifying further comprises:
masking out from each of the regions with the target detection processing apparatus the one or more of the pixels in the image which have the highest determined statistical detection scores in the image;
selecting with the target detection processing apparatus one or of the pixels which are end members for each of the regions; and
identifying with the target detection processing apparatus a convex hull of the selected end members as a boundary for the one or more regions for the image.

29. The method as set forth in claim 1 wherein the determining the object based score further comprises:
unmixing with the target detection processing apparatus the pixel with highest determined statistical detection score in each of the identified regions by finding one or more abundances to determine pixel spectra; and
comparing with the target detection processing apparatus target spectra for each of the one or more targets with the determined pixel spectra to determine the object based score for each of the identified regions.

30. The medium as set forth in claim 10 wherein the identifying further comprises:
masking out from each of the regions the one or more of the pixels in the image which have the highest determined statistical detection scores in the image;
selecting one or of the pixels which are end members for each of the regions; and
identifying a convex hull of the selected end members as a boundary for the one or more regions for each of the one or more of images.

31. The medium as set forth in claim 10 wherein the determining the object based score further comprises:
unmixing the pixel with highest determined statistical detection score in each of the identified regions by finding one or more abundances to determine pixel spectra; and
comparing target spectra for each of the one or more targets with the determined pixel spectra to determine the object based score for each of the identified regions.

32. The apparatus as set forth in claim 19 wherein the one or more processors is further configured to execute programmed instructions stored in the memory for the identifying further comprising:
masking out from each of the regions the one or more of the pixels in the image which have the highest determined statistical detection scores in the image;
selecting one or of the pixels which are end members for each of the regions; and
identifying a convex hull of the selected end members as a boundary for the one or more regions for the image.

33. The apparatus as set forth in claim 19 wherein the one or more processors is further configured to execute programmed instructions stored in the memory for the determining the object based score further comprising:
  unmixing the pixel with highest determined statistical detection score in each of the identified regions by finding one or more abundances to determine pixel spectra; and
  comparing target spectra for each of the one or more targets with the determined pixel spectra to determine the object based score for each of the identified regions.

* * * * *